Sept. 26, 1933.  W. T. HANDWERK  1,928,422
OUTDOOR BLACKBOARD HOLDER
Filed Sept. 7, 1932

Inventor
Walter T. Handwerk

Patented Sept. 26, 1933

1,928,422

UNITED STATES PATENT OFFICE 1,928,422

OUTDOOR BLACKBOARD HOLDER

Walter T. Handwerk, Washington Township, Lehigh County, Pa.

Application September 7, 1932. Serial No. 632,007

1 Claim. (Cl. 40—145)

Figure 1:
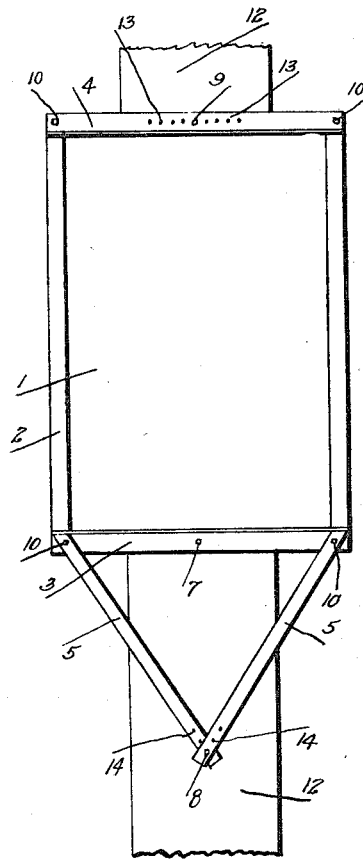
Figure 2:
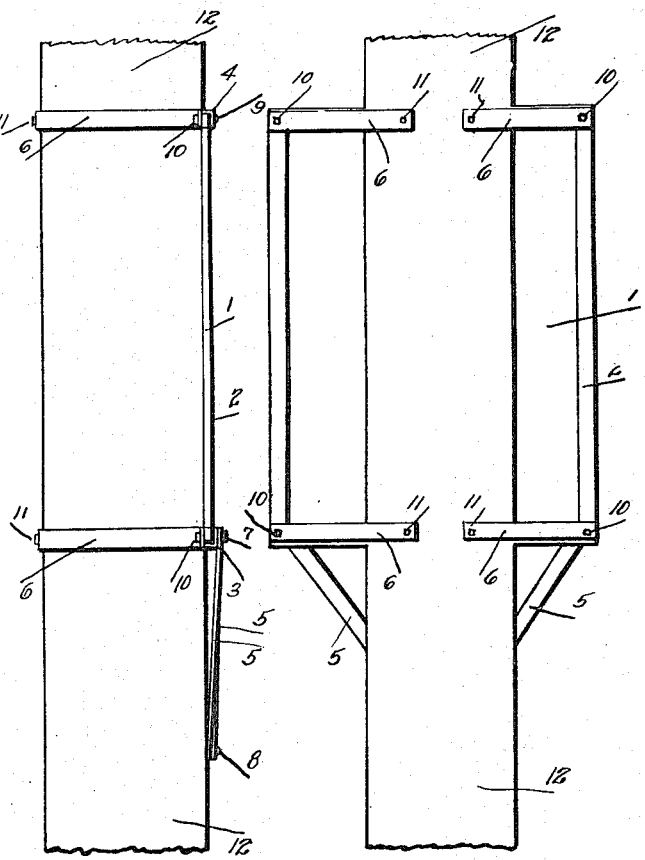
Figure 3:
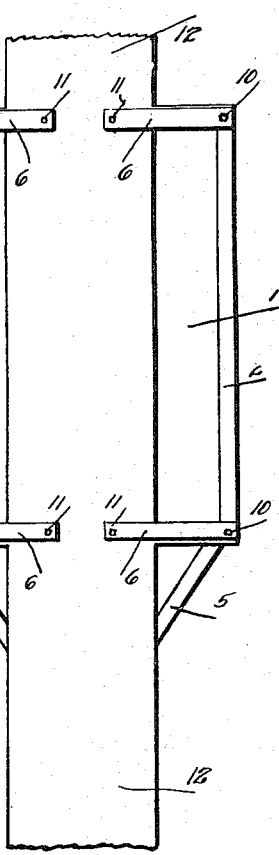

The invention relates to an outdoor blackboard holder to securely fasten a slate blackboard to a tree or post. With the accompanying drawing, I hereby describe the invention:

Fig. 1 is a front view of a blackboard —1 showing the front view of the outdoor blackboard holder; Fig. 2 is a side view showing the position of braces and supports; Fig. 3 is a back view showing the method of fastening the braces —6.

The lower crosspiece angle iron —3, is fastened to tree or post —12, by lag bolt —7. It passes thru angle iron —3 and thru wood frame of blackboard —2 and into tree or post —12.

The upper crosspiece angle iron —4 fastens to tree or post —12 by lag bolt —9. It passes thru angle iron —4, thru wood frame of blackboard —2 and into tree or post —12. The crosspiece angle iron —4 has a number of holes punched —13 to facilitate adjusting to crooked or slanting tree or post —12.

The support irons —5 go from the corners of wood frame of blackboard —2, fastened by machine bolts —10, down to center of tree or post —12 and is fastened to tree or post —12 by lag bolt —8. These supports have a number of holes —14 punched at their lower ends to facilitate adjusting to crooked or slanting tree or post —12.

The braces —6 are fastened at each corner of the wood frame of blackboard —2 by machine bolts —10 to the side or back of tree or post —12 by lag bolts —11.

I claim:

In combination, a slate blackboard for attachment to a tree or post, having a flat wooden frame and angle bars against the front and edge of the frame both at top and bottom, and fastening means comprising lag bolts through the bars and frame adapted to extend into the tree or post, flat support bars secured to the ends of the lower angle bar and crossed at their free ends and adapted to be secured to the tree or post to prevent sagging of the frame, and flat brace bars extending from each corner of the frame at the top and bottom, and being secured to the frame by bolts passing through the wooden frame and angle bars, said brace bars each bent to an angle to conform to the supporting tree or post, and adapted to be secured thereto.

WALTER T. HANDWERK.